F. Z. HANSCOM.
BICUSPID TOOTH AND BACKING.
APPLICATION FILED NOV. 30, 1917.
1,283,505.
Patented Nov. 5, 1918.
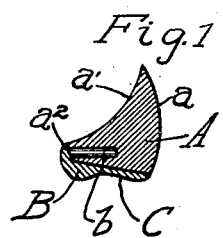
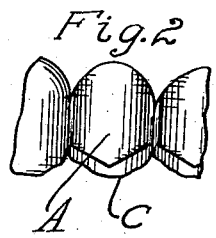
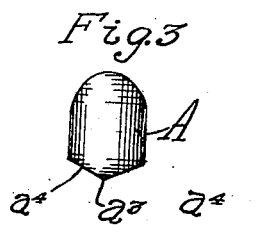
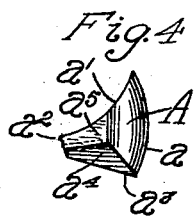
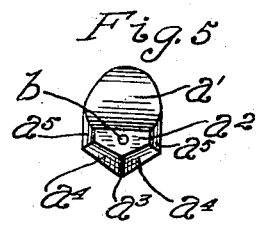
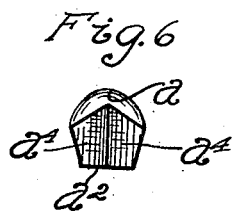
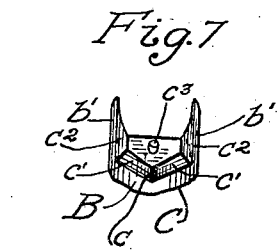
Inventor:
Frank Z. Hanscom,
By Norman King,
Atty.

UNITED STATES PATENT OFFICE.

FRANK Z. HANSCOM, OF ELMHURST, ILLINOIS.

BICUSPID TOOTH AND BACKING.

1,283,505.  Specification of Letters Patent.  Patented Nov. 5, 1918.

Application filed November 30, 1917. Serial No. 204,738.

*To all whom it may concern:*

Be it known that I, FRANK Z. HANSCOM, a citizen of the United States, and a resident of Elmhurst, Dupage county, State of Illinois, have invented certain new and useful Improvements in Bicuspid Teeth and Backings, of which the following, taken in connection with the drawings, is a description.

My invention has for its object the production of artificial teeth, more particularly those known as bicuspid teeth, with backings therefor, which are so constructed and arranged that a greater portion of the porcelain material may be used in making the tooth and requiring less material in the backing therefor, which is usually of gold or other precious metals, thereby greatly reducing the cost of making the same.

It has long been customary to use porcelain as the material out of which artificial teeth are made, without due regard to certain properties inherent in porcelain which prohibit its successful use in any way where there is a possibility of its becoming curved or warped during the soldering or otherwise securing it to the backing, and also that porcelain is easily fractured at any point where there is an opening or scored and weakened line formed therein. For this reason I have so constructed my teeth with the largest possible body portion of porcelain at a point where a hole is to be drilled for the purpose of engaging the casing, thereby giving each tooth greater strength and rigidity than has been customary in former constructions.

A further object of my invention is to so shape the tooth that the front thereof will as nearly as possible resemble the natural tooth, while the rear or posterior portion thereof is formed on straight or beveled lines to fit the metal casing or backing provided for the tooth.

A further object of my invention is to provide an artificial tooth of this kind so shaped and constructed with respect to the backing or casing forming part of the bridge work, that the porcelain part of the tooth fits very closely into the casing provided therefor, so that when the parts are assembled there are no hollow spaces or cavities between the tooth and the backing.

In the accompanying drawing, I have illustrated what I now consider the best embodiment of my invention as applied to a bicuspid tooth, and in these drawings, Figure 1 is a vertical sectional view through the tooth and casing therefor;

Fig. 2 is a fragmentary front elevation of a bridge comprising the invention;

Fig. 3 is a front elevation of a bicuspid tooth with the casing therefor;

Fig. 4 is a side elevation thereof;

Fig. 5 is a rear elevation;

Fig. 6 is a bottom plan view, and

Fig. 7 is an interior view of the casing or backing of the tooth.

Referring to the drawing, the body portion of the tooth A is constructed and shaped as nearly as possible like the natural tooth, which in this instance is the bicuspid tooth, and for the purpose of description will be considered as an upper tooth.

The front or labial surface of the tooth $a$ is curved or convex, as shown more particularly in Figs. 1 and 4. The inner or cervical surface of the tooth is preferably concave, as shown at $a'$, extending from the extreme upper edge of the tooth to the edge of the back area or lingual surface, $a^2$. When to be used this concave surface $a'$ will be ground and fitted to the gums of the wearer.

In making these teeth, I contemplate making them in standard sizes to fit the backings, or casings therefor, the dentist having only to fit the inner or cervical surfaces thereof to the gums of the wearer. As will be observed in the drawings, I have constructed the body portion of the tooth with the largest possible area of porcelain at the point of greatest strength, and have arranged all the fitting edges of the tooth coming in contact with the casing with plain or beveled surfaces, so that there will be no chance of fracture or cleavage in assembling the parts, nor will there be any hollow space between the body of the tooth and the backing or bridge work.

The lower or occlusal surface of the upper tooth here shown is divided by a line $a^3$, extending from the center of the labial surface $a$, rearwardly to the lingual surface, $a^2$, presenting on each side of said central line a bevel-angle, $a^4$, $a^4$, of irregular area, as shown more particularly in Figs. 4 and 5.

The sides also of said tooth, $a^5$, $a^5$, present bevel-angles on lines extending from the occlusal surface to the edge of the labial surface at the front of the tooth to the concave cervical surface, $a'$, and the lingual surface, $a^2$, at the rear of the body portion of the tooth, A. As will be observed more particularly in Figs. 1 and 4, the lingual surface $a^2$ is flat and presents a beveled surface inclining downwardly from the edge of the cervical surface.

A socket $b$ is provided in the body portion of said tooth, which extends inwardly from the lingual surface, $a^2$, either in a horizontal direction, or, if desired, it may be extended at an angle upwardly or downwardly from the horizontal line. This socket, $b$, is adapted to receive a pin projecting from the casing, which will be hereinafter explained.

The bevel-angle $a^5$, $a^5$, at the sides of each tooth provide an area between the contiguous teeth for the upwardly extending wings in the casings which inclose the occlusal surface of the tooth.

The backings or casings B for these teeth are preferably formed of metal, and are made by drop forging or casting the same. These casings are also made in standard sizes, so that the dentist may easily and quickly assemble the same with the porcelain portions which are made to fit them.

The casings are provided with upwardly extending wings, $b'$, $b'$, on each side thereof. The interior of the casing is divided at the center with a line $c$, corresponding to the line $a^3$, in the porcelain portion of the tooth and has the bevel-angle surfaces, $c'$, $c'$, corresponding to the bevel-angle surfaces $a^4$, $a^4$, of each tooth. The bevel-angles, $a^5$, $a^5$, are inclosed by the corresponding angles, $c^2$, $c^2$, in the casing.

The cusp, C, of the tooth is formed as nearly as possible like the natural tooth and extends from the center of the labial surface across the entire occlusal surface and incloses the lingual surface of the porcelain portion of the tooth. Projecting inwardly from the lingual surface of the casing C is a pin or projection, $c^3$, which engages the socket $b$ of the porcelain portion. When these teeth are to be used, the dentist assembles the porcelain portion into this casing, soldering and cementing the same together in the usual manner. The wings, $b'$, of the casing inclosing the sides of the teeth, firmly and securely hold the same together, forming a strong and durable construction able to stand any strain placed upon the teeth in both horizontal and vertical directions. The teeth are inserted and cemented in place in the usual manner.

By this form of construction, it will be observed that I have provided a tooth having a body portion of porcelain, which is much cheaper material than metal, and have constructed a tooth having the properties of durability required, as well as conforming more easily to the appearance of the natural tooth than those as heretofore constructed, and with all the necessary supports and braces required to maintain the tooth in position, giving it the necessary wearing surface for mastication as needed for bicuspid teeth. Forming the body portion of the tooth of porcelain, as I have, with the bevel-angles fitting standard casings provided with requisite retaining means, the tooth is not at any time subject to any strains having a tendency to warp the structure, causing breakage of the material.

I claim:

1. An artificial tooth having a body portion of greater thickness from the labial to the lingual surface than from the labial to the cervical surface, the occlusal surface of said tooth having oppositely facing bevel-angles upon each side of a rearwardly extending central line, substantially as described.

2. An artificial tooth having a body portion of greater thickness from the labial to the lingual surface than from the labial to the cervical surface, the occlusal surface of said tooth having oppositely facing bevel-angles upon each side of a rearwardly extending central line, and a bevel-angle upon each side of said tooth extending from the first named angle to the cervical surface thereof, substantially as described.

3. An artificial tooth comprising a body portion of greater thickness from the labial to the lingual surface than from the labial to the cervical surface, oppositely facing bevel-angles upon the occlusal surface and upon the sides of said tooth, a beveled lingual surface on the body portion of the tooth said body portion having a socket therein entering through the lingual surface, substantially as described.

4. An artificial tooth having a body portion of greater thickness from the labial to the lingual surface thereof than from the labial to the cervical surface, bevel-angles on the occlusal surface and the sides of said tooth, the body portion of said tooth provided with a socket entering from the lingual surface, and a casing having the interior thereof provided with bevel-angle surfaces closely fitting the bevel-angles of the tooth, substantially as described.

5. An artificial tooth having a body portion of greater thickness from the labial to the lingual surface than from the labial to the cervical surface, oppositely facing bevel-angles on the occlusal surface and the sides of said tooth, the lingual surface of said tooth providing a bevel-angle, and a casing having the interior thereof provided with bevel-angle surfaces closely fitting the bevel-angles of the tooth, and said casing provided with a pin projecting into a socket provided in the body portion of the tooth substantially as described.

In testimony whereof I have signed this specification.

FRANK Z. HANSCOM.

Copies of this patent may be obtained for five cents each, by addressing the "Commissioner of Patents, Washington, D. C."